June 6, 1961 E. I. AROLA 2,987,266
FISHING REEL
Filed July 22, 1960 2 Sheets-Sheet 1
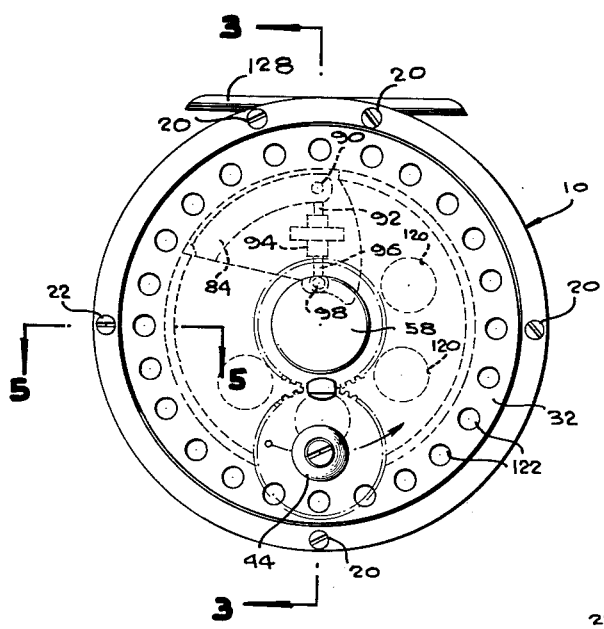
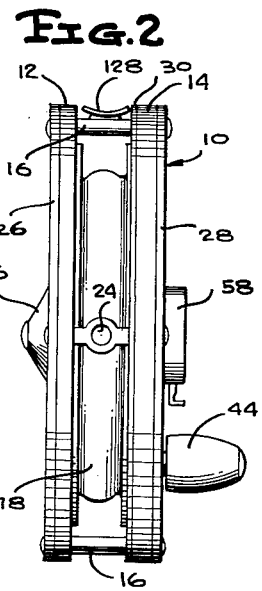
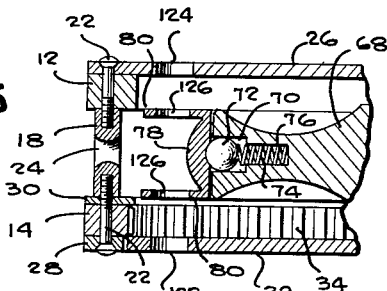
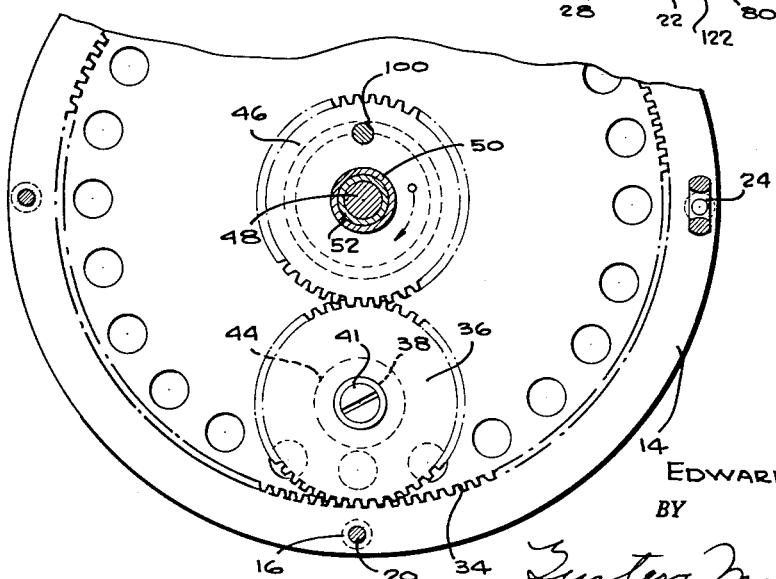
INVENTOR.
EDWARD I. AROLA
BY
ATTORNEY

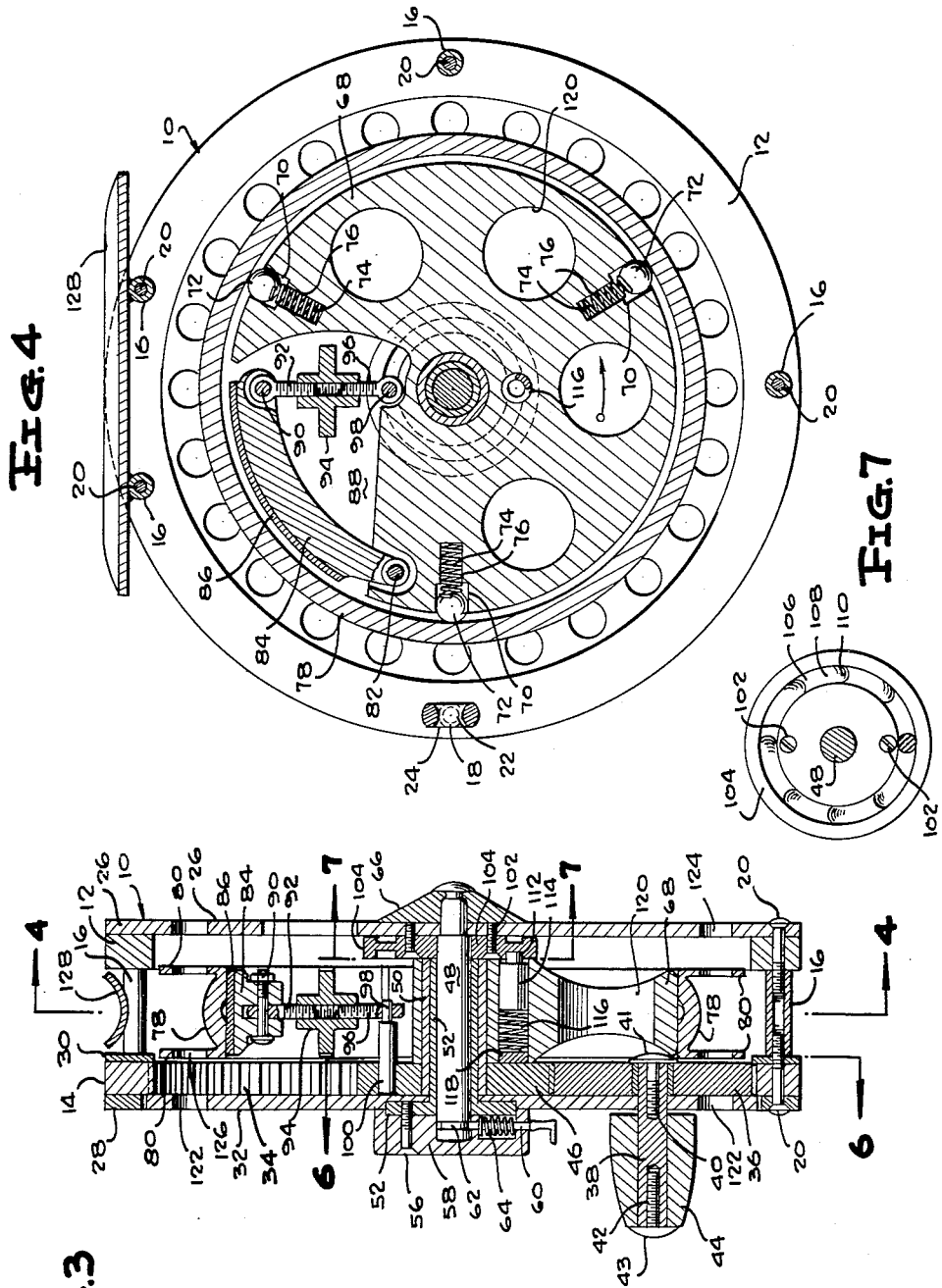

United States Patent Office 2,987,266
Patented June 6, 1961

2,987,266
FISHING REEL
Edward I. Arola, 409 Jasmine Ave.,
Corona Del Mar, Calif.
Filed July 22, 1960, Ser. No. 44,642
4 Claims. (Cl. 242—84.45)

This invention relates to a fishing reel, and it particularly relates to a fishing reel of the type which permits the line to be paid out freely when casting and which, by rotating the reel handle in the winding direction automatically engages the reel spool for winding.

Fishing reels of the aforesaid general type have heretofore been provided. However, these prior reels were generally overly complex and expensive in construction, were subject to easy disrepair, did not provide for sufficiently rapid engagement and disengagament of the handle and spool and were generally unduly bulky and heavy and, therefore, difficult to manipulate. In addition, these prior reels often were provided with projecting levers, rods, etc. which had a tendency to become entangled in brush, tree branches and other obstruction. Another disadvantage often found in prior reels of this type was the inability to adequately prevent overrun or backlash of the line.

It is one object of the present invention to overcome the aforesaid difficulties of the prior reels by providing a fishing reel which is relatively simple in construction, light in weight, free from bulkiness and easy to manipulate.

Another object of the present invention is to provide for rapid and efficient engagement and disengagement of the actuating handle with the spool.

Another object of the present invention is to most effectively prevent over-run or backlash of the fishing line.

Another object of the present invention is to provide a fishing reel of the aforesaid type which is substantially free of projecting parts which would tend to become entangled in brush or other obstructions.

Other objects of the present invention are to provide an improved fishing reel, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

FIG. 1 is a side elevational view of a fishing reel embodying the present invention.

FIG. 2 is an edge elevational view of the reel of FIG. 1.

FIG. 3 is an enlarged sectional view taken on line 3—3 of FIG. 1.

FIG. 4 is a sectional view taken on line 4—4 of FIG. 3.

FIG. 5 is an enlarged, fragmentary sectional view taken on line 5—5 of FIG. 1.

FIG. 6 is a fragmentary sectional view taken on line 6—6 of FIG. 3.

FIG. 7 is a sectional view taken on line 7—7 of FIG. 3.

Referring in greater detail to the drawings wherein similar reference characters refer to similar parts, there is shown a fishing reel, generally designated 10, comprising a housing including a pair of rings 12 and 14 held in spaced, parallel relationship by spacer rod 16 and 18. The rods 16 are hollow and internally threaded to receive oppositely-disposed screws 20 extending from the opposite rings 12 and 14 (see FIG. 3). The spacer rod 18 is provided with oppositely-disposed internally threaded bores to receive corresponding screws 22 (see FIG. 5). In addition, the rod 18 is provided with a central eyelet portion 24 (see FIGS. 2 and 5) through which the fishing line is guided.

Outwardly of the ring 12 is provided a rear plate 26. This plate 26 is also connected to the ring 12 as well as to the rods 16 and 18 by the screws 20 and 22. Outwardly of the ring 14 is provided a guard ring 28 and inwardly of the ring 14 is provided a spool guard shim 30, preferably constructed of nylon or the like. The ring 28 and shim 30 are likewise held fixed to ring 14 by the screws 20 and 22. However, within the encompassing diameter of the guard ring 28 is provided a rotatable front plate 32, this plate 32 being positioned outwardly of the ring 14.

The ring 14 is provided on its inner diameter with a ring gear 34 with which is in mesh a drive gear or pinion 36 (see FIGS. 3 and 6). The pinion 36 is connected to the rotatable plate 32 by means of a shaft 38 having oppositely-disposed internally threaded bores. A screw 40 having an enlarged head 41 connects the pinion 36 to the shaft 38 while a screw 42 having an enlarged head 43 connects a handle 44 to the shaft 38. The handle 44, in turn, is rotatable on shaft 38 and is spaced from the plate 32 (as best seen in FIG. 3).

The pinion 36 is also in mesh with a driven gear 46 mounted about a central shaft 48 for rotation relative thereto. Between the gear 46 and shaft 48 is a bearing sleeve 50 and a sleeve 52. The sleeve 52 is provided with a flange 54 at one end, this flange 54 having secured thereto, as by screws 56, a cap 58. The cap 58 is releasably secured to shaft 48 by a lock pin 60 urged into a groove 62 on the shaft 48 by a spring 64. The opposite end of shaft 48 is secured to a collar 66.

Mounted for rotation on sleeve 50 is a flyer 68. The flyer 68 has a plurality of pockets or recesses 70 on its outer periphery. In these pockets 70 are provided balls 72 which are urged outwardly by corresponding springs 74 positioned in radial bores 76 intersecting their respective pockets 70. These balls 70 bear against the inner periphery of a spool 78 surrounding the flyer 68.

The spool 78 is provided with opposite side flanges 80 and is freely rotatable on the flyer 68, the balls 72 serving as floating means therefor. Pivotally connected at 82 to the flyer 68 is one end of an arcuate brake shoe 84 having a brake band 86 on its outer surface. The brake shoe 84 substantially spans a recess 88 in the flyer 68 and is pivotally connected at its opposite end, as by pivot pin 90, to a threaded rod 92. The rod 92 extends into an internally threaded nut 94 acting as an adjusting turnbuckle. An oppositely-disposed threaded rod 96 extends into the opposite end of nut 94 and is pivotally connected at 98 to a pin 100 extending laterally from gear 46 on the inner face side thereof.

Connected to the inner surface of rear plate 26, as by means of screws 102 is a ratchet race 104 (note particularly FIGS. 3 and 7). The race 104 includes an annular arrangement of high points 106 connected by bevel portions 108 to low points 110. A round pawl 112 on the end of a piston 114 is adapted to coact with the ratchet race 104 to permit rotation of the flyer 68 in only one direction. The piston 114, preferably constructed of nylon or the like, is urged toward the ratchet race 104 by a spring 116, both the piston 114 and the spring 116 being positioned in a transverse bore in the hub portion of the flyer 68. A nylon plug 118 has a friction fit within the bore and acts to keep the spring 116 under compression.

The ratchet race 104 illustrated in the drawings is a left hand race. However, a right hand race with oppositely arranged high and low points can be easily substituted therefor by merely removing the screws 102, substituting one ratchet race for the other, and then replacing the screws 102. In this manner, there is provided a reversible ratchet means whereby the rotation of the flyer 68 can be prevented in either one direction or the other.

The various parts of the reel are provided with apertures to decrease the overall weight of the device. For this purpose, flyer 68 is provided with apertures 120, the rotatable front plate 32 is provided with apertures 122, the rear plate 26 is provided with apertures 124 and the spool flanges 80 are provided with apertures 126.

The reel 10 is provided with a standard type foot or saddle 128 that is adaptable to all types of fishing rods in the ordinary manner.

In operation, the reel 10, when used for casting, permits free rotation of the spool 78 in the unwinding direction, the spool 78 floating on the balls 72 which have a very light frictional contact with the spool 78 to inhibit over-run momentum. However, when a strike is made and it is desired to wind up the line, the handle 44 is used to rotate plate 32. This serves to move gear 36 around the ring gear 34 which causes gear 36 to rotate on its axis. The gear 36 thereupon rotates gear 46 which moves pin 100 in the counterclockwise direction (as viewed in FIG. 4). This causes brake shoe 84 to pivot against the inner surface of spool 78, the brake band 86 frictionally engaging with the said inner surface of the spool 78. Upon continued rotation of the handle 44, the spool 78 is caused to rotate together with flyer 68 and gear 46 and the line is wound up. During the winding process, the ratchet mechanism 104-112 permits rotation of the flyer 68 in the wind-up direction but acts to prevent any rotation in the opposite direction. In this manner, any over-run or backlash is effectively prevented.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A fishing reel comprising a housing including a pair of spaced, parallel rings, a shaft axially extending between said rings, a fixed rear plate on one of said rings, a rotatable front plate on the other ring, said front plate being rotatable around an axis concentric with said shaft, a ring gear on said other ring, an actuating gear rotatably mounted on said shaft, a drive gear in mesh with said ring gear and with said actuating gear, said drive gear being connected to said rotatable front plate, a handle on said rotatable front plate, a rotatable flyer mounted on said shaft within said housing between said rings, a spool rotatably mounted on said flyer, a brake shoe pivotally connected at opposite ends between said flyer and said actuating gear, a brake band on said brake shoe engageable with said spool, and ratchet means for preventing rotation of said flyer in one direction, said ratchet means comprising a ratchet race removably mounted on said fixed rear plate and a pawl on said flyer operatively engaged with said ratchet race.

2. The fishing reel of claim 1, said ratchet race having a series of spaced high and low points connected by intermediate beveled portions, a piston integral with said pawl, said pawl being positioned in a transverse bore in said flyer, and a spring in said bore urging said piston toward said ratchet race.

3. The fishing reel of claim 1, an adjustable rod to which said brake shoe is pivotally connected at one end, a pin extending laterally from one face of said actuating gear, said adjustable rod being in turn pivotally connected to said pin.

4. The fishing reel of claim 1, and spring-pressed balls on the outer periphery of said flyer, said balls being in rotatable engagement with the inner surface of said spool.

References Cited in the file of this patent
UNITED STATES PATENTS

| | | |
|---|---|---|
| 1,296,395 | Hunt | Mar. 4, 1919 |
| 1,781,695 | Mitchell-Henry | Nov. 18, 1930 |
| 2,059,763 | Wenzel | Nov. 3, 1936 |